United States Patent Office 3,325,465
Patented June 13, 1967

3,325,465
POLYMERIZATION
Daniel G. Jones, Cherry Hill, and Phillip S. Landis, Woodbury, N.J., assignors to Mobil Oil Corporation, a corporation of New York
No Drawing. Filed Mar. 29, 1963, Ser. No. 269,164
24 Claims. (Cl. 260—94.9)

This invention relates to a process for polymerizing olefins, and more particularly to a process for polymerizing olefins in the presence of novel catalysts possessing high activity and selectivity.

In the prior art numerous catalysts have been proposed for the polymerization of olefins, one of the most widely used of which is phosphoric acid supported on kieselguhr base. Though offering fairly high initial activity, this catalyst is found under normal operating conditions to become dehydrated and degraded after comparatively short periods of time. This catalyst also undergoes substantially high coke build-up, and since it cannot be regenerated there is a resulting substantial economic loss.

Also widely used catalysts are the oxides of cobalt, nickel, chromium, molybdenum and tungsten on supports such as alumina, silica-alumina, kieselguhr, carbon and the like. In addition to the fact that these catalysts generally lack significant selectivity, it is found that polymerization therewith at elevated temperatures results in appreciable quantities of intermediate cracked products. Moreover, these catalysts are generally difficult to regenerate, are relatively expensive, only moderately active and exhibit a declining activity over periods of many conversion and regeneration cycles.

The present invention is based on the discovery that olefins may be polymerized to obtain high yields of polymer with excellent selectivity by conducting such polymerization in the presence of aluminosilicates as the catalyst. As a class, these metal aluminosilicate catalysts, also known as zeolitic molecular sieves, offer substantial advantages over the above-discussed prior art catalysts. In the first place, the aluminosilicate catalysts are distinguished by the fact that coking, that is deposition of carbonaceous matter on the catalysts, is very slight under the polymerization conditions normally employed. Of course, over a period of time there is some loss of activity which is believed to be due primarily to the formation of small amounts of higher polymer which become occluded within the catalysts. However, and in the second place, regeneration of the catalysts used in the present invention is relatively simple and may be carried out by extraction with organic solvent, e.g., hot benzene or by merely heating at an elevated temperature under vacuum to vaporize such polymer from the catalysts. In addition to the advantages possessed by the aluminosilicate catalysts as a class, it has been found that individual members of that class offer further specific advantages in particular polymerization reactions.

Thus, in one embodiment of this invention polymerization of olefins to produce exceptionally high yields of dimer is affected by employing aluminosilicate catalysts containing nickel or cobalt.

The aluminosilicates usable in accordance with the present invention include a wide variety of hydrogen or metal-containing crystalline aluminosilicates, both natural and synthetic. These aluminosilicates can be described as a rigid three-dimensional network of $SiO_4$ and $AlO_4$ tetrahedra in which the tetrahedra are cross-linked by the sharing of oxygen atoms whereby the ratio of the total aluminum and silicon atoms to oxygen atoms is 1:2. A complete description of zeolites of the type usable in the present invention is found in Patent 2,971,824, which disclosure is incorporated herein by reference. Further discussion of the nature of these catalysts and their methods of preparation is found in U.S. Patents 2,882,244, 3,013,989 and 3,033,778. These aluminosilicates have well-defined intra-crystalline dimensions such that only reactant or product molecules of suitable size and shape may be transported in either direction between the exterior phase and the interior of the crystalline zeolite.

The minimum pore size of the metal aluminosilicates used in the process of this invention will depend upon the nature of the monomer molecules and polymer molecules involved in the reaction. Thus, when working with branch-chain olefins or olefins containing large or bulky molecular substitutents, it may be necessary to have a larger pore size, e.g., 10 or 13 Angstrom units to permit the molecules to pass through said pores to the catalyst sites and permit products to pass therefrom. When working with unsubstituted straight-chain olefins the minimum pore size may be substantially less, as for example, about 5 Angstrom units.

In their hydrated form, the aluminosilicates may be represented by the formula:

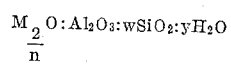

wherein M is a cation which balances the electrovalence of the tetrahedra, $n$ represents the valence of the cation, $w$ the moles of $SiO_2$, and $y$ the moles of $H_2O$, the removal of which produces the characteristic open network system. The cation may be hydrogen or any one or more of a number of metal ions depending upon whether the aluminosilicate is synthesized or occurs naturally. Typical cations include sodium, lithium, potassium, silver, magnesium, zinc, barium, iron, manganese, calcium, rare-earths, cobalt, nickel, chromium, etc. The parent zeolite, if not received in dehydrated form commercially, is dehydrated to actuate it for use as a catalyst. Although the proportions of inorganic oxides in the silicates and their spatial arrangement may vary, effecting distinct properties in the aluminosilicates, the two main characteristics of these materials is the presence in their molecular structure of at least 0.01 equivalent and preferably more than 0.1 equivalent of a hydrogen or metal ion per gram atom of aluminum and an ability to undergo dehydration without substantially affecting the $SiO_4$ and $AlO_4$ framework.

Numerous synthesized aluminosilicates having varying type structures have been disclosed in the prior art, and these aluminosilicates have been designated by their structure, as for examples, zeolite X, Y, L, D, R, S, T, Q and B.

Among the naturally occurring crystalline aluminosilicates which can be employed for purposes of the invention are included faujasite, heulandite, clinoptilolite, dachiardite and aluminosilicates represented as follows wherein metal cations other than those shown may be present.

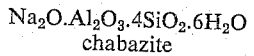
chabazite

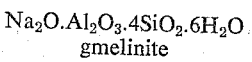
gmelinite

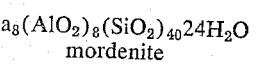
mordenite

Among the most preferred aluminosilicates for use in this invention are cation-exchanged natural and synthetic faujasite. By the term "synthetic faujasite" is meant those synthetic aluminosilicates having a structure and properties extremely similar to naturally occurring faujasite and an $SiO_1/Al_2O_3$ ratio of 2 to 6 or higher. Typical of these synthetic faujasite are zeolite X and Y described above. For purposes of this description and appendant claims, the term "faujasite" is intended to include naturally occurring faujasite and synthetic faujasite.

The non-sodium forms of the metal-containing aluminosilicates may be suitable prepared from the sodium forms thereof by a conventional replacement technique, involving the contacting of the crystalline sodium aluminosilicate zeolite with a solution of an ionizable compound of the ion which is to be exchanged into the molecular sieve structure for a sufficient time to bring about the extent of desired introduction of such ion. Repeated use of fresh solutions of the entering ion is of value to secure more complete exchange. After such treatment, the resulting exchanged product is water-washed, dried and dehydrated.

In preparing the non-sodium forms of the catalyst composition, the aluminosilicate can be contacted with a non-aqueous or aqueous fluid medium comprising a gas, polar solvent or water solution containing the desired metallic salt soluble in the fluid medium. Introduction of hydrogen ions is suitably effected by contact of the aluminosilicate with an ammonia-containing medium, such as an ammonium salt solution which serves to exchange into the aluminosilicate ammonium ions which upon subsequent heating are converted to hydrogen ions. The alumino-silicates of high silica content, such as for example zeolite Y, may be treated directly without adverse affect with an acid, e.g. hydrochloric acid. Water is the preferred medium for reasons of economy and ease of preparation in large scale operations involving continuous or batchwise treatment. Similarly, for this reason, organic solvents are less preferred, but can be employed providing the solvent permits ionization of the metallic salt. Typical solvents include cyclic and acyclic ethers such as dioxane, tetrahydrofuran, ethyl ether, diethyl ether, diisopropyl ether, and the like; ketones such as acetone and methyl ethyl ketone; esters such as ethyl acetate, propyl acetate; alcohols such as ethanol, propanol, butanol, etc.; and miscellaneous solvents such as dimethylformamide and the like.

The metal cation may be present in the fluid medium in an amount varying within wide limits dependent upon the pH value of the fluid medium. Where the aluminosilicate material has a molar ratio of silica to alumina greater than about 5.0, the fluid medium may contain a metal cation equivalent to a pH value ranging from less than 4.0 up to a pH value of about 10.0, preferably between 4.5 and 8.5. Where the silica:alumina molar ratio is greater than about 2.2 and less than about 5.0, the pH value for the fluid media containing a metal cation ranges from 3.8 to 8.5. Thus, depending upon the silica to alumina ratio, the pH value varies within rather wide limits.

In carrying out the treatment with the fluid medium the procedure employed comprises contacting the aluminosilicate with the desired fluid medium or media until such time as metallic cations originally present in the aluminosilicates are exhausted to the desired degree and replaced by hydrogen and/or other metal ions. Effective tretament with the fluid medium to obtain a modified aluminosilicate having high catalytic activity will vary, of course, with the duration of the treatment and temperature at which it is carried out. Elevated temperatures tend to hasten the speed of treatment whereas the duration thereof varies inversely with the concentration of the ions in the fluid medium. In general, the temperatures employed range from below ambient room temperature of 24° C. up to temperatures below the decomposition temperature of the aluminosilicate. Following the fluid treatment, the treated aluminosilicate is washed with water, preferably distilled water, until the effluent wash water has a pH value of wash water, i.e. between about 5 and 8 and air dried. The aluminosilicate material is thereafter analyzed for cation content by methods well-known in the art. Analysis also involves analyzing the effluent wash for anions contained in the wash as a result of the treatment, as well as determination of and correction for anions that pass into the effluent wash from soluble substances or decomposition products of insoluble substances which are otherwise present in the aluminosilicate as impurities.

The actual procedure employed for carrying out the fluid treatment of the aluminosilicate may be accomplished in a batchwise or continuous method under atmospheric, subatmospheric or superatmospheric pressure. A solution of the ions of positive valence in the form of a molten material, vapor, aqueous or non-aqueous solution, may be passed slowly through a fixed bed of the aluminosilicate. If desired, hydrothermal treatment or a corresponding non-aqueous treatment with polar solvents may be effected by introducing the aluminosilicate and fluid medium into a closed vessel maintained under autogeneous pressure. Similarly, treatments involving fusion or vapor phase contact may be employed.

A wide variety of metallic compounds can be employed with facility as a source of metallic cations and include both inorganic and organic salts of the metals of Group I–B through Group VIII of the Periodic Table.

Representative of the salts which can be employed include chlorides, bromides, iodides, carbonates, bicarbonates, sulfates, sulfides, thiocyanates, dithiocarbamates, peroxysulfates, acetates, benzoates, citrates, fluorides, nitrates, nitrites, formates, propionates, butyrates, valerates, lactates, malonates, oxalates, palmitates, hydroxides, tartrates and the like. The only limitation on the particular metal salt or salts employed is that it be soluble in the fluid medium in which it is used. The preferred salts are the chlorides, nitrates, acetates and sulfates.

Of the wide variety of metallic salts which can be employed, there may be mentioned salts of trivalent metals, divalent metals and monovalent metals. Of the divalent metals, some preferred ones are of Group II–A of the Periodic Table. Other preferred salts are those of the rare metals including cerium, lanthanum, praseodymium, neodymium, illinium, samarium, europium, gadolinium, terbium, dysprosium, holmium, erbium, thulium, yttrium, and lutecium.

The rare-earth salts employed can either be the salt of a single metal or, preferably, of mixtures of metals such as a rare-earth chloride or didymium chlorides. As hereinafter referred to, a rare-earth chloride solution is a mixture of rare-earth chlorides consisting essentially of the chlorides of lanthanum, cerium, neodymium and praseodymium with minor amounts of samarium, gadolinium and yttrium. The rare-earth chloride solution is commercially available and it contains the chlorides of a rare-earth mixture having the relative composition: cerium (as $CeO_2$) 48 percent by weight; lanthanum (as $La_2O_3$) 24 percent by weight; praseodymium (as $Pr_6O_{11}$) 5 percent by weight; neodymium (as $Nd_2O_3$) 17 percent by weight; samarium (as $Sm_2O_3$) 3 percent by weight; gadolinium (As $Gd_2O_3$) 2 percent by weight; yttrium (as $Y_2O_3$) 0.2 percent by weight; and other rare-earth oxides 0.8 percent by weight. Dymium chloride is also a mixture of rare-earth chlorides, but having a low cerium content. It consists of the following rate-earths determined as oxides: lanthanum 45–46 percent by weight; cerium 1–2 percent by weight; praseodymium 9–10 percent by weight; neodymium 32–33 percent by weight; samarium 5–6 percent by weight; gadolinium 3–4 percent by weight; yttrium 0.4 percent by weight; other rare-earths 1–2 percent by weight. It is to be understood that other mixtures of rare-earths are equally applicable in the instant invention.

Representative metal salts which can be employed, aside from the mixtures mentioned above, include silver chloride, silver sulfate, silver nitrate, silver acetate, silver arsenate, silver bromide, silver citrate, silver carbonate, silver oxide, silver tartrate, calcium acetate, calcium arsenate, calcium benzoate, calcium bromide, calcium carbonate, calcium chloride, calcium citrate, beryllium bromide, beryllium carbonate, beryllium hydroxide, beryllium sulfate, barium acetate, barium bromide, barium carbonate, barium citrate, barium malonate, barium nitrite, barium oxide, barium sulfide, manganese chloride, manganese bromide, manganese sulfate, manganese nitrate, magnesium chloride, magnesium bromide, magnesium sulfate, magnesium sulfide, magnesium acetate magnesium formate, magnesium stearate, magnesium tartrate, zinc sulfate, zinc nitrate, zinc acetate, zinc chloride, zinc bromide, aluminum chloride, aluminum bromide, aluminum acetate, aluminum citrate, aluminum nitrate, aluminum oxide, aluminum phosphate, aluminum sulfate, titanium bromide, titanium chloride, titanium nitrate, titanium sulfate, zirconium chloride, zirconium nitrate, zirconium sulfate, chromic acetate, chromic chloride, chromic nitrate, chromic sulfate, ferric chloride, ferric bromide, ferric acetate, ferrous chloride, ferrous arsenate, ferrous lactate, ferrous sulfate, nickel chloride, nickel bromide, cerous acetate, cerous bromide, cerous carbonate, cerous chloride, cerous iodide, cerous sulfate, cerous sulfide, lanthanum chloride, lanthanum bromide, lanthanum nitrate, lanthanum sulfate, lanthanum sulfide, yttrium bromate, yttrium bromide, yttrium chloride, yttrium nitrate, yttrium sulfate, samarium acetate, samarium chloride, samarium bromide, samarium sulfate, neodymium chloride, neodymium oxide, neodymium sulfide, neodymium sulfate, praseodymium chloride, praseodymium bromide, praseodymium sulfate, praseodymium sulfide, etc.

The catalyst may be used in powdered, granular or molded state formed into spheres or pellets of finely divided particles having a particle size of 2 to 500 mesh. In cases where the catalyst is molded, such as by extrusion, the alminosilicate may be extruded before drying, or dried, or partially dried and then extruded. The catalyst product is then preferably precalcined in an inert atmosphere near the temperature contemplated for conversion but may be calcined initially during use in the conversion process. Generally, the aluminosilicate is dried at between 150° F. and 600° F. and thereafter calcined in air or an inert atmosphere of nitrogen, hydrogen, helium, flue gas or other inert gas at temperatures ranging from about 500° F. to 1500° F. for periods of time ranging from 1 to 48 hours or more.

The preferred catalysts just described may be used as such or distributed in a predetermined amount of an inert and/or catalytically active material which serves as a base, support, carrier, binder, matrix or promoter for the aluminosilicate. Thus, the aluminosilicate may be distributed in a clay binder. A particularly preferred catalyst form is an aluminosilicate dispersed in a dried inorganic oxide amorphous gel. The siliceous gel-aluminosilicate product may be prepared in any desired physical form. Generally spherical beads may be prepared by dispersing the aluminosilicate in an inorganic oxide sol according to the method described in U.S. Patent 2,900,399 and converting to a gelled bead according to the method described in U.S. Patent 2,384,946.

Polymerization in accordance with the present invention is effected by contacting a material containing polymerizable hydrocarbon groups with the described crystalline aluminosilicate catalysts under polymerizing conditions including a temperature of $-45°$ C. to 400° C. or higher, a pressure of 0.25 to 1000 atm. and a liquid hourly space velocity within the approximate range of 0.1 to 10 or equivalent contact time for batch processess. Compounds undergoing treatment in accordance with such process include normal olefins, iso-olefins, halogen-substituted olefinic hydrocarbons, hydrocarbons which contain polymerizable olefinic groups and oxygen bonds, conjugated diolefins, halogen or aromatic substituted conjugated diolefins, olefinic hydrocarbons which are terminated by carboxylic or esters of carboxylic groups, polymerizable vinyl and alkenyl aromatic compounds, polymerizable olefinic hydrocarbons that contain silicon-carbon bonds, and in general, compounds with at least one polymerizable olefinic group.

Though the polymerization process of this invention is applicable, as indicated above, to the polymerization of a wide variety of polymerizable olefinic compounds, a particularly preferred aspect of the invention is in the polymerization of gaseous and liquid olefinic hydrocarbons to produce comparatively low molecular weight hydrocarbons boiling in the naphtha and motor fuel boiling range or higher molecular weight liquid products as well as solid polymeric products, e.g. polyethylene and polypropylene.

In one embodiment of the invention it has been found that lower molecular weight olefinic hydrocarbons, i.e. containing two to six carbon atoms, may be polymerized with extremely high yields of dimers to the substantial exclusion of trimers and higher polymers by conducting the polymerization over aluminosilicates which have been exchanged with nickel or cobalt ions. It has been found that replacement of a comparatively small portion of the cations normally found in the crystalline aluminosilicates with nickel or cobalt ions will render such crystalline aluminosilicates very highly selective for the formation of dimers. Though it is preferred that the nickel or cobalt content be at least 2 percent based on the weight of the aluminosilicate, it has been found that as little as 0.5 percent is sufficient to provide a polymerization catalyst highly selective for the production of dimers.

In carrying out the polymerization process utilizing nickel or cobalt-exchanged aluminosilicates, a fairly wide range of temperatures may be employed from about 25° C. to about 400° C. or higher with a temperature range of about 200 to 350° C. being preferred with the nickel-exchanged catalyst since little improvement in conversion or product composition is noted at the more elevated temperatures and, moreover, cracking of the hydrocarbon feed becomes more extensive at the elevated temperatures. With the cobalt-exchanged sieves a temperature range of 45° C. to 160° C. is preferred since temperatures above 160° C. cause more rapid deactivation of the catalysts while temperatures below 45° C. generally effect polymerization at an undesirably slow rate.

The polymerization reaction is most conveniently conducted at atmospheric pressure, though pressures up to about 1000 atms. may be used. Operation at elevated pressures permit an increase of through-put, but may have the disadvantage in some cases of increasing the deactivation rate of the catalysts by increasing polymer retention within the cobalt or nickel-exchanged aluminosilicates.

The space velocity may vary over a fairly wide range, i.e. about 50 to 1000 vol. gas/hour/vol. cat., but ordinarily a space velocity of less than 300 vol. gas/hr./vol. catalyst is preferred. The polymerizable olefins may be passed through the reactor in admixture with hydrocarbon diluents such as the paraffins and/or cycloparaffins.

The excellent catalyst life obtained during the practice of the present invention may be further improved by conducting the polymerization of the olefins in the presence of carbon dioxide. As suggested in U.S. Patent 3,033,778 to Frilette, carbon dioxide may be added to the gas feed which is sent to the reactor.

According to a further embodiment of this invention, the life of the catalyst may also be improved by including within the reactant olefin stream a solvent for higher molecular weight polymers which tend to deactivate the catalyst over a period of time. Thus, it has been found that catalyst life has been substantially extended in the polymerization of propylene using decaline as a solvent. In general, however, the use of a solvent in this manner is believed desirable only when polymerizing the more reactive olefins, e.g. ethylene and propylene at fairly low temperatures.

To further illustrate the present invention as concerned with the use of cobalt or nickel-exchanged aluminosilicates the following specific examples are presented which examples are not to be interpreted as unduly limiting said invention.

In producing the nickel-exchanged aluminosilicates the zeolitic molecular sieves in their sodium or sodium-calcium form and in the form of 1/16 inch pellets containing 20 percent clay binder were added to a quantity of water containing various amounts of nickel nitrate. After overnight exchange, the pellets amounts of nickel nitrate. After overnight exchange, the pellets were filtered, washed and dried and then dehydrated at 350° C. Using this method, specific catalysts having varying degrees of nickel nitrate were prepared as follows:

100 g. 13X + 17 ml. 1 M $NiNO_3$ + 64 ml. $H_2O \rightarrow$
    6.5% Na exchanged = 0.91% Ni 100 g. 13X + 33 ml. 1 M $NiNO_3$ + 48 ml. $H_2O \rightarrow$
    13% Na exchanged = 1.75% Ni 100 g. 13X + 67 ml. 1 M $NiNO_3$ + 14 ml. $H_2O \rightarrow$
    25% Na exchanged = 3.40% Ni 100 g. 13X + 202 ml. 1 M $NiNO_3$ + 0 ml. $H_2O \rightarrow$
    48% Na exchanged = 6.28% Ni Utilizing substantially the same method except that cobalt chloride solution was used as the cation-exchange medium, there were prepared a number of cobalt-exchanged aluminosilicates containing varying quantities of cobalt as indicated in the following examples.

Utilizing the catalysts prepared in the above manner, the polymerization reactions were carried out by passing olefin gas, either in a pure form or admixed with the olefin feed gas components indicated through a 20 x 1.5 cm. Vycor reactor with a 6 mm. thermowell extending through the length of the reactor which contained 2 cc. of catalyst, with a 2 to 3 cm. bed of alumina chips as a preheater section. The reactor was wrapped with resistance wire and insulated with asbestos tape and aluminum foil. Temperature control in the catalyst bed was controlled by varying the heat input with a Powerstat. The olefin and other component feed rates were measured by means of a rotometer, while the exit vapors were analyzed by vaporphase chromatography and mass spectrometry to determine rates of conversion and product composition. In some cases, the total product was condensed from the unreacted olefin and the liquid analyzed by vapor phase chromatography.

For greater ease of interpretation and assessment Examples 1 and 2 are presented in the following Table A:

TABLE A

| | Example 1 | Example 2 |
|---|---|---|
| Olefin feed: Propylene catalyst | (¹) | (¹) |
| Reaction Temperature, °C | 205 | 315 |
| Pressure | (²) | (²) |
| Space Velocity, cu. ft./hr | 0.2 | 0.2 |
| Conversion to Liquid Product (percent) | 40 | 40 |
| Liquid Product (percent): | | |
|   $C_4$ olefins | 0.1 | 1.8 |
|   $C_5$ olefins | 0.5 | 3.9 |
|   $C_6$ olefins | 68.4 | 61.0 |
|   $C_7$ olefins | 2.5 | 8.6 |
|   $C_8$ olefins | 2.3 | 7.0 |
|   $C_9$ olefins | 25.7 | 17.7 |
|   Higher olefins | 0.7 | 0.0 |

¹ 13X [22% Sodium Exchanged, 3.4% nickel].
² Atmospheric.

*Examples 3–6*

Examples 3–6 illustrate the highly selective formation of dimers during the polymerization of ethylene, using 13X molecular sieve pellets having varying amounts of nickelous ions exchanged therein. In each case 10 ml. of catalyst was placed in a reactor and heated to polymerization temperatures after which ethylene was passed over the catalyst at atmosphere pressure and at a rate of 0.1 cu. ft./hr. Gas samples were periodically removed and analyzed by vapor-phase chromatography and by mass spectrometry. The analysis as a function of time for each of Examples 3, 4, 5 and 6 is shown in the following Tables B, C, D and E:

TABLE B

| Time, Hrs. | $CH_4$, percent | $C_2H_4$, percent | $C_2H_6$, percent | $C_3H_6$, percent | $C_4H_{10}$, percent | $C_4H_8$, percent | Higher, percent |
|---|---|---|---|---|---|---|---|
| 0 | 0.1 | 99.7 | | 0.1 | | 0.1 | |
| 2.3 | 0.1 | 87.38 | | 0.21 | 0.07 | 12.24 | Trace |
| 3.0 | 0.1 | 82.1 | 1.0 | 0.3 | 0.1 | 15.1 | 1.3 |
| 3.9 | 0.1 | 84.6 | | 0.20 | 0.03 | 14.9 | 0.3 |
| 6.4 | | 94.1 | 0.2 | 0.8 | 0.1 | 6.8 | 0.9 |
| 8.0 | 0.1 | 92.8 | | 0.08 | 0.03 | 6.2 | 0.1 |

Temp: 270–280° C.
Catalyst: 6.5% Sodium Exchanged, 0.91% Nickel.

TABLE C

| Time, Hrs. | $CH_4$+air, percent | $C_2H_4$, percent | $C_3H_6$+$C_3H_8$, percent | $C_4H_{10}$, percent | $C_4H_8$, percent | Higher, percent |
|---|---|---|---|---|---|---|
| 0 | 0.1 | 99.7 | 0.1 | | 0.1 | |
| 0.1 | 1.39 | 98.15 | 0.03 | 0.07 | 0.36 | |
| 0.6 | 1.05 | 98.33 | 0.03 | 0.04 | 0.55 | |
| 1.1 | 1.56 | 49.78 | 1.39 | 0.70 | 45.18 | 1.40 |
| 1.9 | 0.80 | 81.03 | 0.23 | 0.06 | 17.88 | Trace |
| 2.5 | 0.71 | 92.80 | 0.08 | 0.08 | 6.33 | |

Temp: 270° C.
Catalyst: 13% Sodium Exchanged, 1.75% Nickel.

TABLE D

| Time, Hrs. | $CH_4$+air, percent | $C_2H_4$, percent | $C_3H_6$, percent | $C_4H_{10}$, percent | $C_4H_8$, percent | Higher, percent |
|---|---|---|---|---|---|---|
| 0.0 | 1.39 | 98.29 | 0.02 | 0.03 | 0.26 | |
| 0.1 | 1.34 | 98.13 | 0.01 | 0.02 | 0.47 | |
| 0.4 | 1.35 | 60.60 | 1.32 | 1.08 | 34.61 | 1.00 |
| 0.7 | 2.72 | 68.42 | 0.67 | 0.37 | 27.02 | 0.80 |
| 0.9 | 1.46 | 78.65 | 0.28 | 0.17 | 19.44 | Small |
| 1.1 | 0.74 | 84.28 | 0.15 | 0.10 | 14.72 | Small |
| 1.4 | 1.42 | 89.22 | 0.15 | 0.06 | 9.14 | Small |
| 2.0 | 1.27 | 90.91 | 0.11 | 0.15 | 7.41 | Small |
| 2.4 | 1.36 | 93.25 | 0.16 | 0.03 | 52.0 | |

Temp: 263–270° C.
Catalyst: 25% Sodium Exchanged, 3.40% Nickel.

TABLE E

| Time, Hrs. | $CH_4$+air, percent | $C_2H_4$, percent | $C_3H_6$, percent | $C_4H_{10}$, percent | $C_4H_8$, percent |
|---|---|---|---|---|---|
| 0.1 | 1.05 | 98.49 | 0.03 | 0.05 | 0.38 |
| 0.3 | 1.01 | 98.35 | 0.05 | 0.07 | 0.52 |
| 0.5 | 1.15 | 74.74 | 0.43 | 0.53 | 23.29 |
| 0.7 | 0.97 | 74.60 | 0.36 | 0.38 | 23.69 |
| 0.9 | 0.89 | 80.68 | 0.31 | 0.33 | 17.80 |
| 1.9 | 0.84 | 93.90 | 0.12 | 0.08 | 5.06 |

Temp: 265° C.
Catalyst: 48% Sodium Exchanged, 6.28% Nickel.

Example 7

To illustrate the relative ease with which the catalysts employed in the present process may be regenerated, Examples 7 is presented. In this example the used catalyst from Example 4 was placed in a test tube which was then placed in an oven overnight at 370° C. under 0.2 mm. vacuum. Five and one-half grams of the catalyst lost 0.265 gram in weight by this treatment. A viscous oil was noted on the walls of the test tube. Using this regenerated catalyst, polymerization of ethylene was conducted in the manner described in Examples 3-6 and the results tubulated in Table F were noted.

Similar catalyst reactivation was observed with the catalyst from Example 5 which was reactivated by extraction of the organic material from the catalyst using hot benzene. In this case, 0.172 gram of a waxy, yellow oil was removed from 10 ml. of catalyst by extraction with benzene in a Soxhlet extractor.

TABLE F

| Time, Hrs. | CH$_4$+air, percent | C$_2$H$_4$, percent | C$_3$H$_8$+C$_3$H$_6$, percent | C$_4$H$_{10}$, percent | C$_4$H$_8$, percent |
|---|---|---|---|---|---|
| 0.5 | 1.25 | 75.33 | 0.32 | 0.14 | 22.96 |
| 0.75 | 0.95 | 74.02 | 0.36 | 0.21 | 24.45 |
| 1.25 | 0.92 | 84.73 | 0.20 | 0.09 | 14.06 |
| 1.9 | 0.95 | 90.58 | 0.02 | 0.18 | 8.27 |
| 2.5 | 1.81 | 92.66 | 0.03 | 0.12 | 5.38 |

Temp: 270° C.
Catalyst: Regenerated Catalyst of Example 4.

Example 8

In this example the embodiment of the invention wherein catalyst life is extended by incorporating carbon dioxide into the olefin feed is illustrated. Using the catalyst described in Example 4, ethylene was passed over the catalyst at a rate of 60 cc. per minute, and a temperature of 333° C. at atmospheric pressure, while carbon dioxide was added to the gas feed at a rate of 33 cc. per minute. The following result illustrates that the catalyst life is increased appreciably by the use of carbon dioxide.

| Time, hrs | Percent conversion to butenes |
|---|---|
| 1.1 | 12.9 |
| 2.1 | 18.4 |
| 3.1 | 15.7 |
| 5.5 | 9.1 |
| 6.5 | 7.5 |
| 8.5 | 5.8 |
| 10.5 | 3.0 |

After 10.5 hours the carbon dioxide feed was stopped and immediately the ethylene conversion increased. After an additional 1.3 hours the conversion to butenes had jumped to 41%.

Example 9

In this example a series of runs were conducted wherein isobutylene was conducted over a 13X molecular sieve which had 95.9 percent of its sodium ions exchanged by cobalt ions. The several runs were all conducted at atmospheric pressure and the temperatures indicated while feed rates are reported at 70° F. and 1 atmosphere, and contact times are based on feed rates at these conditions. The conversion is calculated as the percentage of the mols of isobutylene in the feed converted to dimer per pass. while the selectivity is based on the mol percentage of the reacted isobutylene converted to dimer. It will be noted that in all cases selectivity was over 90 percent and generally approached 100 percent as indicated in the following table:

TABLE G

| Run # | Isobutylene, ml./min. | Air, ml./min. | Steam, ml./min. | Contact time, Seconds | Temp., °C. | Percent conv. to dimer | Percent selectivity |
|---|---|---|---|---|---|---|---|
| 1 | 12 | 28 | 7.4 | 2.5 | 73 | 7.48 | 99 |
| 2 | 13 | 28 | 5.6 | 2.6 | 114 | 13.4 | 91 |
| 3 | 14 | 28 | 6.6 | 2.5 | 126 | 6.4 | 97 |
| 4 | 15 | 28 | 9.5 | 2.3 | 47 | 9.5 | 100 |
| 5 | 14 | 28 | 10.2 | 2.2 | 145 | 7.3 | 98 |
| 6 | 14 | 33 | 7.4 | 2.2 | 154 | 5.1 | 98 |

In conducting the above series of runs in the absence of steam and air higher yields of dimers are obtained.

As previously indicated, polymerization of olefins over aluminosilicate catalysts can be successfully utilized for the production of liquid hydrocarbons suitable in the preparation of motor fuel oils. To illustrate this aspect of the invention, 13X molecular sieve was ion exchanged with an aqueous solution containing 5 weight percent of rare-earth metal chloride hexahydrate (RECl$_4$.6H$_2$O) and 2 weight percent ammonium chloride. Using 1 volume of the above solution per volume of aqueous slurry of the 13X molecular sieve, four contacts were carried out overnight at room temperature and eight contacts of 2-hours duration each were carried out at 180° F. The resulting product was filtered, washed free of chloride, dried at 230° F. and pelleted. The resulting pellets were calcined for 10 hours at 1000° F. The sodium content of the resulting product was 0.13 weight percent, the rare-earth content was 25.2 weight percent, and the product was characterized by a surface area of 455 square meters per gram. The product also contained a small amount of hydrogen ions.

Example 10

Into a 1 liter stainless steel bomb the REHX (13X molecular sieve containing rare-earth and hydrogen ions) catalyst prepared as just described was inserted in the form of an approximately 200 mesh powder. The temperature of the reactor bomb was maintained at approximately 400° F. and the olefin introduced thereto, after which polymerization was continued for a period of three hours. At the end of the polymerization period the liquid product was passed through filter paper to remove catalyst particles and thereafter subjected to mass spectrometry for analysis. For further information concerning these tests and the results obtained therefrom, attention is directed to the following Table H:

TABLE H

| Olefin | Propylene | 1-Hexene |
|---|---|---|
| Grams | 130 | 252 |
| Cat. | REHX | REHX |
| Grams | 20 | 20 |
| Pressure, p.s.i.g., maximum | 820 | 500 |
| Final (at 400° F.) | 765 | 300 |
| Liquid Product: | | |
| Grams | 40 | 227 |
| Gravity, °API | 57.1 | 70.6 |
| Gravity, Specific | 0.7503 | 0.7001 |
| Bromine Number | 98 | 150 |

Example 11

A crystalline sodium aluminosilicate having uniform pore openings between 6 and 15 Angstrom units was prepared according to the procedure described in U.S. Patent 2,882,244. The sodium aluminosilicate was base-exchanged using about 60 times its weight of an aqueous solution containing 2 weight percent ammonium chloride and 5 weight percent rare-earth chlorides containing as its principal constituent cerium chloride, along with the chlorides of praseodymium, lanthanum, neodymium and samarium. The base-exchange was conducted continuously for 12 hours at 180° F. After the base-exchange operation was completed, the rare-earth aluminosilicate was washed free of chloride at 180° F. using water. The resulting product was oven dried at 230° F. for 20 hours and calcined for 10 hours at 1000° F. Following the calcination step, the catalyst was further steamed for 24 hours at 1200° F. at 15 pounds per square inch gauge using 100 percent steam. The resulting rare-earth-hydrogen alumino-silicate product contained 25.5 weight percent rare-earth oxides, 0.21 weight percent sodium and a small amount of hydrogen ions and had a surface area of 389 square meters per gram.

The catalyst (14–25 mesh) and 1-decene were charged to an autoclave. The autoclave was pressure tested at 1000 pounds per square inch gauge nitrogen and the pressure released, thereby removing excess oxygen. Heat was then applied and the autoclave rocked for a reaction period of 5 hours. The pressure of the autoclave during the reaction never exceeded 100 pounds per square inch gauge. The liquid product was distilled in a single plate column under 2–4 mm. pressure to obtain the various fractions. The amount of reactants, reacting conditions, yields of products and physical properties of a lubricating oil fraction obtained are described below in Table I:

TABLE I

| | |
|---|---|
| Catalyst | REHX |
| Weight percent of charge | 12 |
| Grams catalyst | 21 |
| 1-decene, grams | 175 |
| Reaction temperature, ° F. | 400 |
| Recovery, weight percent | 99 |
| Yields, weight percent: | |
| Monomer fraction | 51 |
| Dimer fraction (to 650° F.) | 33 |
| Lubricating oil fraction (650° F.+) | 12 |
| Coke | 3 |
| Lubricating oil properties: | |
| Gravity, ° API | 38.6 |
| Bromine No. | 39.0 |
| Kinematic Viscosity, cs.: | |
| At 100 ° F. | 20.21 |
| At 210° F. | 4.20 |
| Viscosity index | 130 |
| Pour point | −65 |

It is to be understood that the above description is merely illustrative of preferred embodiments of this invention, of which many variations may be made within the scope of the following claims by those skilled in the art without departing from the spirit thereof.

What is claimed is:

1. A process for polylmerizing olefinic hydrocarbons which comprises polymerizing the same under polymerization conditions to a product in which dimers predominate in the presence of a crystalline aluminosilicate catalyst having a pore diameter of sufficient size to permit ingress of reactant molecules and egress of product molecules, the initially present cations of said aluminosilicate having been partially exchanged by cations selected from the group consisting of cobalt, nickel and rare earth cations.

2. A process according to claim 1, further comprising mixing a minor amount of carbon dioxide with said polymerizable olefins.

3. A process according to claim 1, wherein the polymerization is carried out in an inert organic solvent.

4. A process according to claim 1, wherein said aluminosilicate is dispersed in a matrix.

5. A process according to claim 4, wherein said aluminosilicate is dispersed in an inorganic oxide gel.

6. A process according to claim 1, wherein said olefin is an aliphatic olefinic hydrocarbon.

7. A process for polymerizing aliphatic olefinic hydrocarbons which comprises contacting the same under polymerizing conditions with an aluminosilicate having a pore diameter sufficient large to permit ingress of reactant molecules and egress of product molecules, said aluminosilicate having been modified by the partial exchange of cobalt ions for the metal cations initially present.

8. A process according to claim 7, wherein said olefin contains 2 to 6 carbon atoms.

9. A process according to claim 8, wherein said olefin is ethylene.

10. A process according to claim 8, wherein said olefin is propylene.

11. A process according to claim 8, wherein said process is conducted at a temperature of 45–160° C.

12. A process of polymerizing olefinic hydrocarbons containing 2 to 6 carbon atoms for the predominate production of dimers which comprises contacting at least one of said olefinic hydrocarbons with a catalyst consisting essentially of a crystalline metallic aluminosilicate having a pore diameter sufficiently large to permit ingress of reactant molecules and egress of product molecules, said catalyst containing at least 0.5 percent of cobalt cations and said process being conducted at a temperature of 45–160° C.

13. A process for polymerizing polymerizable olefins which comprises contacting at least one of said olefins with a catalyst comprising a metallic aluminosilicate having pore diameter sufficiently large to permit ingress of reactant molecules and egress of product molecules, said aluminosilicate having part of its initial cations exchanged by nickel cations.

14. A process according to claim 13, wherein said aluminosilicate contains at least 0.5 percent nickel.

15. A process according to claim 14, wherein said polymerizable olefin is an olefinic hydrocarbon containing 2–6 carbon atoms.

16. A process according to claim 13, wherein said olefin is ethylene.

17. A process according to claim 13, wherein said olefin is propylene.

18. The process of polymerizing olefinic hydrocarbons containing 2 to 6 atoms for the predominate production of dimers comprising contacting at least one of said olefinic hydrocarbons at a temperature of about 200–350° C. with a catalyst comprising essentially a crystalline metallic aluminosilicate having a pore diameter of at least 5 Angstrom units and containing at least 0.5 percent of nickel ions which have been exchanged for the metal cations initially present in the aluminosilicate.

19. The process of claim 18, wherein said olefinic hydrocarbon is propylene.

20. A process for polymerizing polymerizable olefins which comprises contacting the same under polymerizing conditions with an aluminosilicate having a pore diameter sufficiently large to permit ingress of reactant molecules and egress of product molecules, said aluminosilicate having been modified by the partial exchange of rare-earth ions for the metal cations initially present.

21. A process according to claim 20, wherein said exchanged aluminosilicate also contains hydrogen ions.

22. A process according to claim 21, wherein said polymerizable olefin is 1-hexene.

23. A process according to claim 21, wherein said polymerizable olefin is propylene.

24. A process according to claim 21, wherein said polymerizable olefin is 1-decene.

References Cited

UNITED STATES PATENTS

| | | | |
|---|---|---|---|
| 3,113,166 | 12/1963 | Weesner | 260—94.9 |
| 3,178,365 | 4/1965 | Miale | 260—683.15 |
| 3,236,762 | 2/1966 | Rabo et al. | 260—683.15 |

JOSEPH L. SCHOFER, *Primary Examiner.*

L. EDELMAN, *Assistant Examiner.*